(12) United States Patent
Miller et al.

(10) Patent No.: US 10,819,525 B2
(45) Date of Patent: Oct. 27, 2020

(54) NETWORK TRAFFIC WITH CREDENTIAL SIGNATURES

(71) Applicant: Amazon Technologies, Inc., Seattle, WA (US)

(72) Inventors: Kevin Christopher Miller, Fairfax, VA (US); Colm Gearóid MacCárthaigh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 146 days.

(21) Appl. No.: 16/010,361

(22) Filed: Jun. 15, 2018

(65) Prior Publication Data

US 2018/0294973 A1 Oct. 11, 2018

Related U.S. Application Data

(62) Division of application No. 14/855,280, filed on Sep. 15, 2015, now Pat. No. 10,003,466.

(51) Int. Cl.
*H04L 29/00* (2006.01)
*H04L 9/32* (2006.01)
*H04L 29/06* (2006.01)
*H04L 9/14* (2006.01)
*H04L 12/823* (2013.01)

(52) U.S. Cl.
CPC ............. *H04L 9/3247* (2013.01); *H04L 9/14* (2013.01); *H04L 69/22* (2013.01); *H04L 47/32* (2013.01); *H04L 2209/24* (2013.01); *H04L 2209/72* (2013.01)

(58) Field of Classification Search
CPC ......... H04L 9/3247; H04L 9/14; H04L 47/32; H04L 69/22; H04L 2209/72; H04L 2209/24
See application file for complete search history.

(56) References Cited

U.S. PATENT DOCUMENTS 5,455,865 A * 10/1995 Perlman ................. H04L 29/06
370/389
5,892,899 A * 4/1999 Aucsmith ............... G06F 21/57
380/282

(Continued)

OTHER PUBLICATIONS

Krishnan et al., "A Uniform Format for IPv6 Extension Headers," Request for Comments: 6564, Standards Track, Apr. 2012, 6 pages.

(Continued)

*Primary Examiner* — Don G Zhao
(74) *Attorney, Agent, or Firm* — Davis Wright Tremaine LLP

(57) ABSTRACT

Data is split into a set of data packets and transmitted between a client computer system and a network service via a packet-switched network. The client computer system identifies a role, permission, group, or other credential that is associated with the data packets, and attaches a credential identifier such as a digital signature to the packets before they are transmitted over the network. A network service receives the data packets, and is configured to filter or route the data packets to a recipient using the attached credential identifier. The network service can adjust the filtering or routing process to occur within a data link, network, transport, or application layer. In some examples, the filtering or routing is provided from within a hypervisor.

20 Claims, 10 Drawing Sheets

(56) References Cited

U.S. PATENT DOCUMENTS

| | | | | |
|---|---|---|---|---|
| 5,956,404 | A * | 9/1999 | Schneier | G06Q 20/401 380/30 |
| 6,078,968 | A * | 6/2000 | Lo | G06F 9/54 710/11 |
| 6,694,381 | B1 * | 2/2004 | Lo | G06F 9/54 710/11 |
| 6,987,726 | B1 * | 1/2006 | Elliott | H04L 45/02 370/217 |
| 9,479,522 | B1 * | 10/2016 | Cirkovic | H04L 63/1416 |
| 9,560,524 | B1 * | 1/2017 | Reeves | H04W 12/06 |
| 9,614,773 | B1 * | 4/2017 | Tagore | H04L 47/2441 |
| 2002/0184149 | A1 * | 12/2002 | Jones | G06Q 20/105 705/41 |
| 2004/0148356 | A1 * | 7/2004 | Bishop, Jr. | H04L 51/38 709/206 |
| 2004/0199668 | A1 * | 10/2004 | Lin | H04W 48/20 709/241 |
| 2004/0268121 | A1 * | 12/2004 | Shelest | H04L 63/0272 713/156 |
| 2005/0171937 | A1 * | 8/2005 | Hughes | G06F 16/9014 |
| 2006/0034179 | A1 * | 2/2006 | Carter | H04L 45/306 370/241 |
| 2006/0048228 | A1 * | 3/2006 | Takemori | G06F 21/577 726/22 |
| 2006/0168213 | A1 * | 7/2006 | Richardson | G06F 21/552 709/225 |
| 2006/0212932 | A1 * | 9/2006 | Patrick | H04L 63/1441 726/11 |
| 2006/0248045 | A1 * | 11/2006 | Toledano | G06F 21/6218 |
| 2009/0262743 | A1 * | 10/2009 | Uyehara | H04L 43/08 370/394 |
| 2009/0328186 | A1 * | 12/2009 | Pollutro | G06F 21/31 726/13 |
| 2010/0088423 | A1 * | 4/2010 | Mazzagatte | H04L 63/08 709/229 |
| 2010/0159878 | A1 * | 6/2010 | Kim | H04L 63/12 455/411 |
| 2012/0216271 | A1 * | 8/2012 | Cooper | H04L 63/0254 726/12 |
| 2013/0064095 | A1 * | 3/2013 | Chew | H04L 43/50 370/241 |
| 2013/0088966 | A1 * | 4/2013 | Mahkonen | H04L 63/12 370/235 |
| 2013/0114606 | A1 * | 5/2013 | Schrum, Jr. | H04L 47/125 370/395.53 |
| 2013/0152161 | A1 * | 6/2013 | Onno | H04L 63/20 726/1 |
| 2013/0173923 | A1 * | 7/2013 | Qiu | H04L 63/12 713/176 |
| 2014/0164776 | A1 * | 6/2014 | Hook | G06F 21/6218 713/171 |
| 2014/0304505 | A1 * | 10/2014 | Dawson | G06F 21/6227 713/165 |
| 2015/0033340 | A1 * | 1/2015 | Giokas | H04L 63/1433 726/23 |
| 2015/0319614 | A1 * | 11/2015 | Cho | H04L 9/3247 726/7 |
| 2015/0350235 | A1 * | 12/2015 | Kim | H04L 63/1433 726/25 |
| 2016/0019384 | A1 * | 1/2016 | Benson | H04K 3/22 726/22 |
| 2016/0212066 | A1 * | 7/2016 | Ravindran | H04L 47/80 |
| 2016/0286391 | A1 * | 9/2016 | Khan | G06Q 20/322 |
| 2017/0005872 | A1 * | 1/2017 | Liu | H04L 41/0893 |
| 2018/0062859 | A1 * | 3/2018 | Janjua | H04L 9/0643 |

OTHER PUBLICATIONS

Postel, "Internet Protocol, DARPA Internet Program Protocol Specification," Information Science Institute University of Southern California, Request for Comments 791, Sep. 1981, 49 pages.

Postel, "Transmission Control Protocol, DARPA Internet Program Protocol Specification," Information Science Institute University of Southern California, Request for Comments 793, Sep. 1981, 161 pages.

* cited by examiner

NETWORK TRAFFIC WITH CREDENTIAL SIGNATURES

CROSS REFERENCE TO RELATED APPLICATION

This application is a division of U.S. patent application Ser. No. 14/855,280, filed Sep. 15, 2015, entitled "NETWORK TRAFFIC WITH CREDENTIAL SIGNATURES," the disclosure of which is hereby incorporated herein in its entirety for all purposes.

BACKGROUND

Computer networks are an important part of modern computing environments. Computer networks can allow connected computer systems to communicate with each other, share information with each other, and access online services. Packet-switched computer networks move information by dividing data into a collection of separate data packets or data blocks. Individual packets of information are transmitted across a network by hubs, switches and routers to a final destination entity. In some examples, individually addressed data packets are transmitted between a pair of computer systems using a datagram protocol such as the User Datagram Protocol ("UDP"). Using a datagram protocol, when an individual data packet is transmitted to a recipient, the recipient may or may not confirm the receipt of the individual data packet. In other examples, computer systems can use a connection-oriented protocol such as the Transmission Control Protocol ("TCP") to establish a logical connection over a physical computer network. Using the logical connection, a sequence of packets can be reliably transmitted, in order, between the pair of computer systems.

In networked environments such as those described above, after application data has been split into packets and placed on a computer network, it can be difficult to identify credentials that are associated with individual packets. In many situations, a recipient combines many individual packets and interprets them in accordance with one or more higher-level network protocols to identify a characteristic that is associated with the individual packets. For example, credentials that are transmitted from a client to a service at the application level can be split and transmitted over a computer network using multiple data packets. When the data packets arrive at the service, the data packets are recombined so that the credential can be accessed and authenticated.

BRIEF DESCRIPTION OF THE DRAWINGS

Various embodiments in accordance with the present disclosure will be described with reference to the drawings, in which.

DETAILED DESCRIPTION

Figure 1:
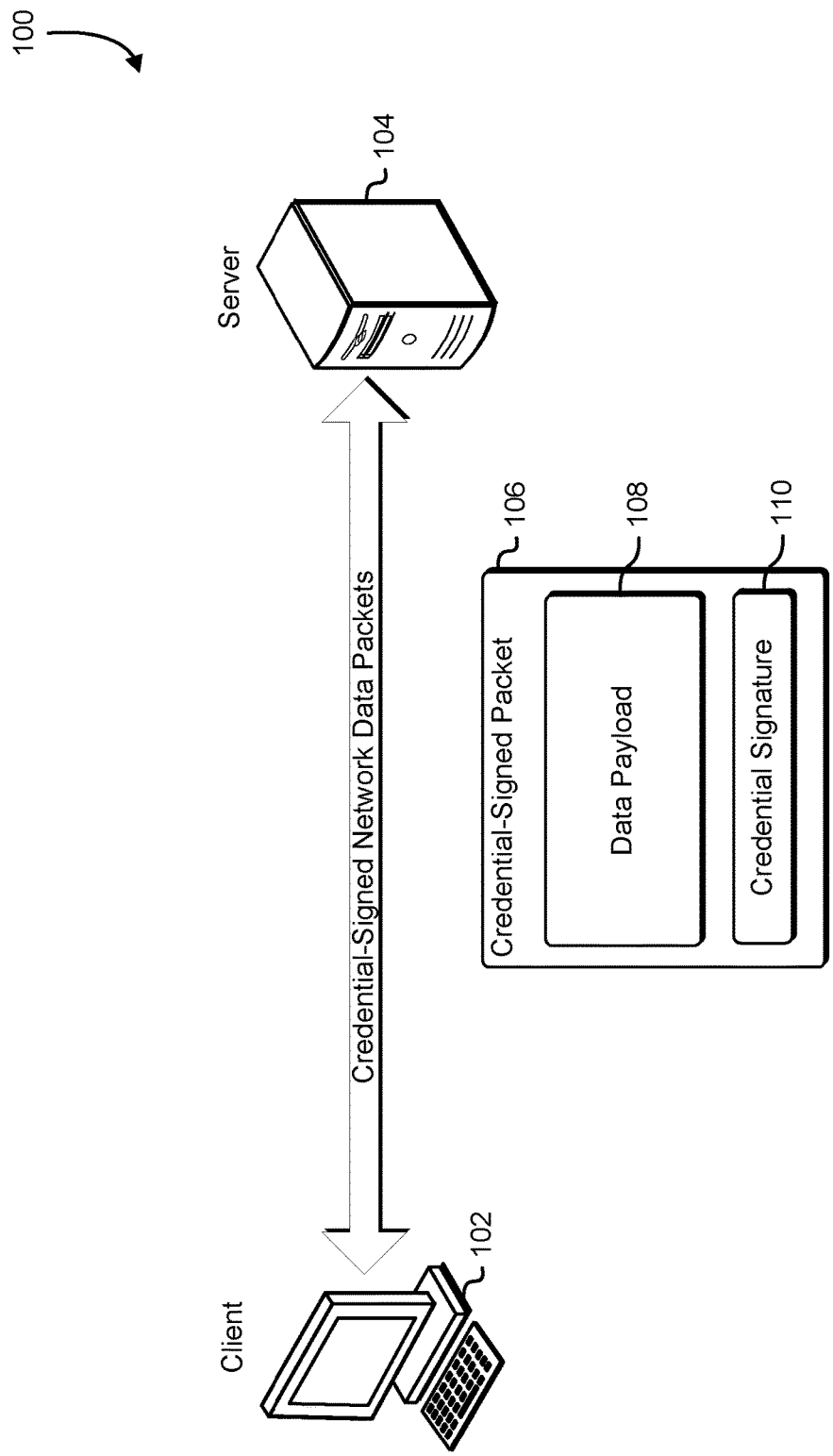
FIG. 1 shows an illustrative example of an environment in which various embodiments may be practiced.

Techniques described and suggested in the current document include systems and methods that manage network traffic by adding credential information to individual packets that make up network communications. In various examples, a client identifies a role, permission, group, or other credential that is associated with a network transmission. When the outgoing network transmission is processed by the network stack, the outgoing transmission is split into a set of network packets, and information that identifies the credential is added to the network packets. When the network packets are received by the recipient such as network service, the credential information can be used to filter or route the network packets prior to reassembling the original network transmission. In this way, the management of network traffic and the operation of the system as a whole can be improved.

Applications, services, and other network clients use a variety of credentials that authorize operations, identify clients and service providers, and define groups or roles. In many examples, the credentials are maintained by and accessible to a client application. The client application facilitates the adding of credentials to network traffic by providing the credentials to a credential handler within a networking stack. In one example, the credentials are provided to the credential handler within the networking stack using an application programming interface ("API") such as the Sockets or Winsock API. The credentials are associated with a networking socket through the use of an extension to the Sockets API setsocketopt( ) function. The credential handler maintains an association between the specified socket and credential and, after the transport layer of the network stack divides the network traffic into packets, the credential handler adds credential information to the packets. Network and data link headers can be added to the packets after the addition of credential information in order to preserve header-level compatibility with systems that do not implement credential-signed packets. In another example, credential information is added to packets after the addition of network or data link headers, and the original network and data link headers are updated to reflect changes in packet size (total length field) and content (checksum).

The credential handler is able to access the network traffic as it is processed by the protocol layers of the networking stack. In one example, the credential handler accesses the network traffic after the network stack has split the network traffic into a set of network packets. The credential handler determines credential information associated with the network traffic based at least in part on credential information provided by the client application. The credential handler adds a credential ID to the network packets, and then signs the network packets. In another example, the credential handler accesses received network packets after the network stack has performed data link filtering, but before recombining the network packets. Credential information is extracted from the received network packets and used to filter those packets which either do not contain a signed credential, or do not contain a credential that provides access to the client application.

The network packets can be signed by the credential handler using a cryptographic key associated with the credential. In one example, the credentials are associated with a cryptographic public-private key pair. A private key of the public-private key pair is associated with the credential and known by an entity that controls the credential such as a client application or service. The public key of the public-private key pair is accessible to the recipient. The private key is used to sign a message with a digital signature that, when verified using a corresponding public key, confirms that the signature and the message were signed by an entity that controls the credential. In another example, a credential is associated with a symmetric cryptographic key that is accessible to both the sender and the recipient. A shared-secret key is combined with the message using a one-way cryptographic hashing function to generate a signature which is transmitted with the message. A recipient repeats the steps performed by the sender to verify the signature and confirm that the message is associated with the credential.

The credential handler can operate in coordination with network firewalls outside the networking stack to provide credential-based packet filtering at more than one point within the system. For example, the credential handler can be configured to receive data packets that have been processed by the data link layer of the networking stack, and determine whether the data packets include a valid credential signature. Data packets that include a valid credential signature are forwarded to the network layer of the networking stack for further processing, and data packets that do not include a valid credential signature are discarded. In another example, the credential handler can be configured to process data packets that have been processed by the network layer of the networking stack, but have not been reassembled by the transport layer of the networking stack. The credential handler extracts properly signed credential information from the data packets, and processes the packets according to rules that are provided by the client application. If the rules provided by the client state that a credential included with a particular data packet is to be forwarded to the client application, the credential handler forwards the particular packets to the transport layer of the networking stack for reassembly.

In some systems, credentials may be used by other firewalls or network traffic filters outside the networking stack to filter network traffic. For example, a service may be implemented on a virtual machine that is hosted using a hypervisor. The hypervisor can provide virtual networking services including firewall services and group management services. The firewall services provided by the hypervisor may be configured to use credential information to filter or direct the network traffic to the service or other services running on virtual machines that are hosted by the hypervisor.

The point at which credential-based network traffic filtering is provided can be adaptively adjusted during the operation of the system in order to respond to changes in network traffic, system load, or attacks on the system. For example, credential-based network traffic filtering can be added between the data link layer and the network layer of the networking stack in response to the detection of a denial of service attack. By detecting and removing data packets that do not contain a valid credential signature before the data packets reach the network layer of the networking stack, data packets are quickly and easily discarded, potentially reducing the impact of the denial of service attack. In another example, a credential-based network traffic filter is added between the network and transport layers of the networking stack when the computing load on the hypervisor exceeds a predetermined threshold. Data packets that do not have credentials that are necessary to access the service are discarded before the data packets reach the hypervisor, potentially reducing the processing load imposed on the hypervisor. In yet another example, a credential-based traffic filter within the networking stack is monitored to determine a packet rejection rate for the credential-based traffic filter. If the packet rejection rate falls below a predetermined threshold, the credential-based traffic filter in the networking stack is disabled, and a replacement credential-based traffic filter is enabled in a hypervisor.

FIG. 1 shows an illustrative example of an environment in which various embodiments may be practiced. A system 100 includes a client 102 and a server 104. The client 102 and the server 104 communicate via a packet-switched network. Messages that are exchanged between the client 102 and the server 104 divided into a collection of data packets. Each packet in the collection of data packets identifies a credential that is associated with each packet. A credential-signed packet 106 includes a data payload 108 and a credential signature 110. The data payload 108 may include some or all of a message exchanged between the client 102 and the server 104. The credential signature 110 is appended to the credential-signed packet by the sender, and interpreted by the recipient. In various implementations, the recipient uses the credential signature 110 to identify the credential associated with the particular packet, and routes or filters the particular packet based at least in part on the identity of the credential.

Routing and filtering operations that utilize the identified credential may be performed by the recipient at various points within a networking stack that processes incoming network packets. Credential-based filtering can be applied to a collection of received data packets that make up a message before the collection of data packets is recombined by a transport protocol to reform the message. In some examples, credential-based packet-filtering rules are applied to the network packets after the network packets are processed by a network layer but before the network packets are processed by a transport layer of the networking stack. In another example, incoming packets that do not contain a credential signature are filtered between the data link and network layers of the networking stack.

The credential signature 110 can identify a particular credential by using a combination of credential identifiers, digital signatures, or cryptographic authenticators. In some examples, the credential signature 110 includes a credential ID and a digital signature that is generated using a symmetric cryptographic key that is accessible to the sender and the recipient. The digital signature may be associated with the signing entity, such as the sender of the recipient, or may be associated with the credential.

Figure 2:
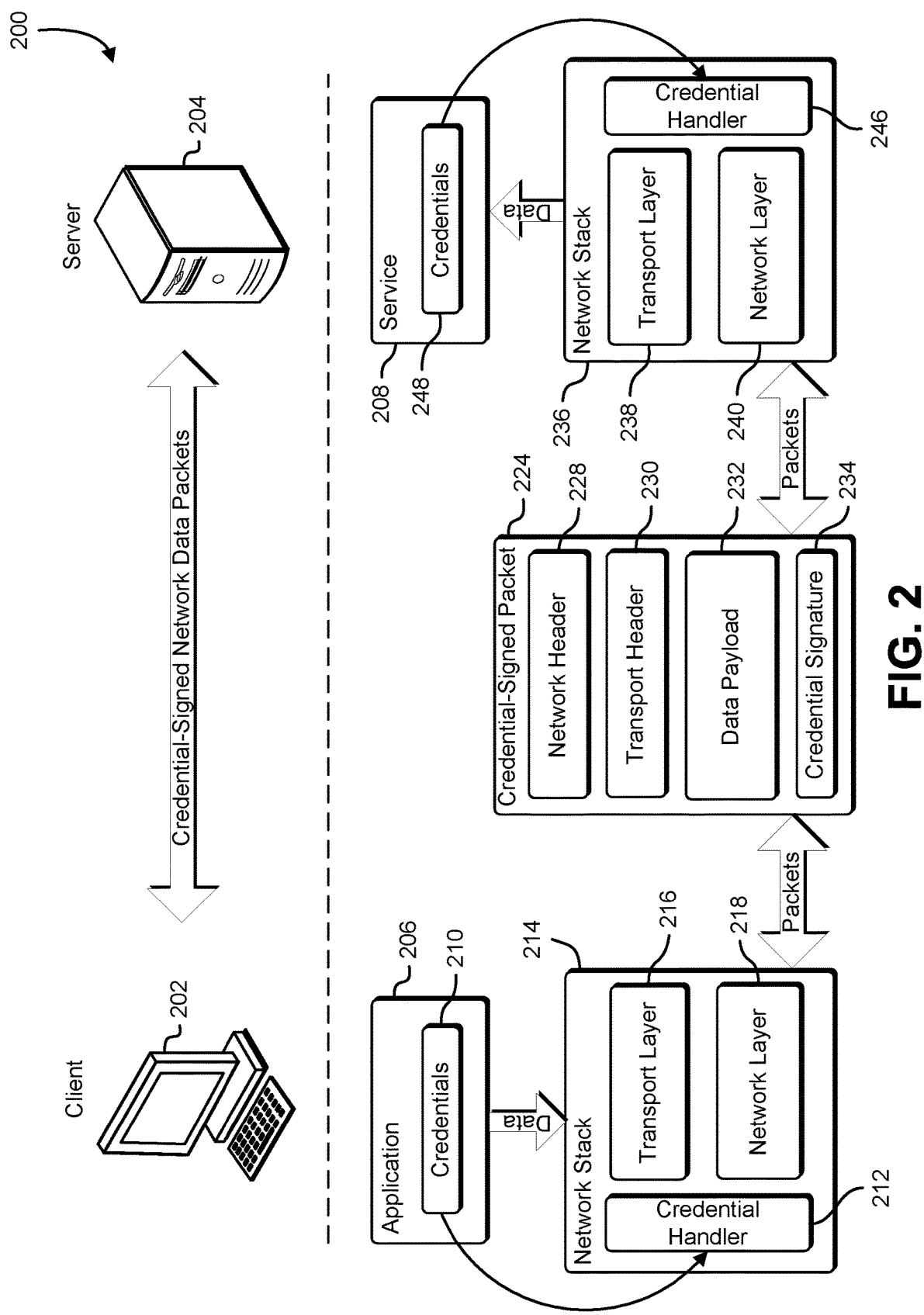
FIG. 2 shows an illustrative example of a system that generates and exchanges credential-signed network packets over a network, in accordance with an embodiment.

FIG. 2 shows an illustrative example of a system that generates and exchanges credential-signed network packets over a network, in accordance with an embodiment. A system 200 includes a client 202 and a server 204 that communicate over a network using credential-signed network data packets. The client 202 can be a client computer system, web browser, service agent, mobile device, or virtual machine that hosts a client application 206. The server 204 can be a server, web server, server cluster, virtual server, or cluster of virtual servers that provides a service 208. The client application 206 maintains a set of credentials 210. The set of credentials 210 can include groups, security roles, accounts, digital certificates, or other credentials.

Information from the set of credentials 210 is provided to a credential handler 212 within a network stack 214 within an operating system running on the client 202. The network stack 214 includes a transport layer 216 and a network layer 218. The transport layer 216 can be implemented using a commercially available transport protocol such as TCP. The transport layer 216 is responsible for splitting outgoing network traffic into a set of data packets, and recombining incoming data packets before returning them to the client application 206. The network layer 218 can be implemented using a network protocol such as IPv4 or IPv6. Additional information regarding the IPv4 and IPv6 protocols can be found in RFC 791 and RFC 793 respectively. The network layer 218 adds network address information to the set of data packets and assists in routing data packets across multiple networks.

The network stack 214 processes outgoing network traffic into a set of credential-signed data packets. A credential-signed packet 224 includes a network header 228, a data payload 232, and a credential signature 234. The data payload 232 is produced by the transport layer 216 when the outgoing network traffic is divided into a set of data packets. The transport layer 216 adds a transport header 230 to the credential-signed packet 224 and passes the packets to the network layer 218. The transport header 230 includes information that allows packets to be reassembled when they arrive at the recipient. The network layer 218 adds a network header 228 to the credential-signed packet 224. The network header 228 includes network address and routing information.

A credential signature 234 is added as a trailer to the end of the credential-signed packet 224 by the credential handler 212. The credential signature 234 includes a digital signature that is based at least in part on a cryptographic key. In some examples, the cryptographic key is associated with a particular credential that is associated with the credential-signed packet 224. In another example, the cryptographic key is associated with a signing entity such as a client or service, and the credential signature 234 includes a credential ID that identifies a particular credential. The digital signature is calculated using the contents of the data payload 232. In some implementations, some or all of the information in the transport header 230 may be used to calculate the digital signature.

The credential signature 234 can be applied after the transport header 230 is added to the credential-signed packet 224, and before the network header 228 and a data link header are added to the credential-signed packet 224. If the credential signature 234 is applied after the network header 228 is applied, the credential handler 212 adjusts the contents of the network header 228 to account for changes in the length and contents of the credential-signed packet 224. If the credential signature 234 is applied after the data link header is applied to the credential-signed packet 224, the credential handler 212 adjusts the contents of the data link header to account for the changes to the links and contents of the credential-signed packet 224. By adjusting the packet headers that are applied before the credential signature 234 is applied, the credential handler 212 ensures that the credential-signed packet 224 remains compatible with network protocols implemented by the network layer 218 and the data link layer.

The credential-signed packet 224 is transmitted from the client 202 and is processed by a receiving network stack 236 running on the server 204. The receiving network stack 236 includes a transport layer 238, and a network layer 240. A receiving credential handler 246 within the receiving network stack 236 is able to access the credential-signed data packets as they are processed by the various layers of the receiving network stack 236. Credential information and credential rules are provided to the receiving credential handler 246 by the service 208. The credential-signed packet 224 is received and forwarded to the receiving credential handler 246.

The receiving credential handler 246 processes the credential signature 234 contained within the credential-signed packet 224. The credential signature 234 is validated using a cryptographic key that corresponds to the cryptographic key used by the credential handler 212 when generating the credential signature 234. In some examples, the cryptographic key is a symmetric key that is accessible to both the client application 206 and the service 208. In another example, the cryptographic key is a public-private key pair where the private key is used to generate the credential signature 234, and the corresponding public key is used to validate the credential signature 234. The credential signature 234 in combination with an optional credential ID identifies a particular credential associated with the credential-signed packet 224. Using the credential rules supplied by the service 208 and the identified particular credential 248, the receiving credential handler 246 determines whether the credential-signed packet 224 should be filtered or forwarded to the network layer 240 for further processing by the receiving network stack 236. If the credential handler 246 forwards the credential-signed packet 224 to the network layer 240 the network layer 240 processes the credential-signed packet 224 according to the contents of the network header 228 and forwards the packet to the transport layer 238 for additional processing. In some implementations, the header of the packet is adjusted to account for the addition of the credential signature to the packet. In some examples, the adjustment is accomplished by at least in part removing the credential signature form the packet. The transport layer 238 processes the credential-signed packet 224 according to the contents of the transport header 230, and reassembles the fragmented packets into an original message transmitted by the client application 206. The receiving network stack 236 sends the original message to the service 208.

Figure 3:
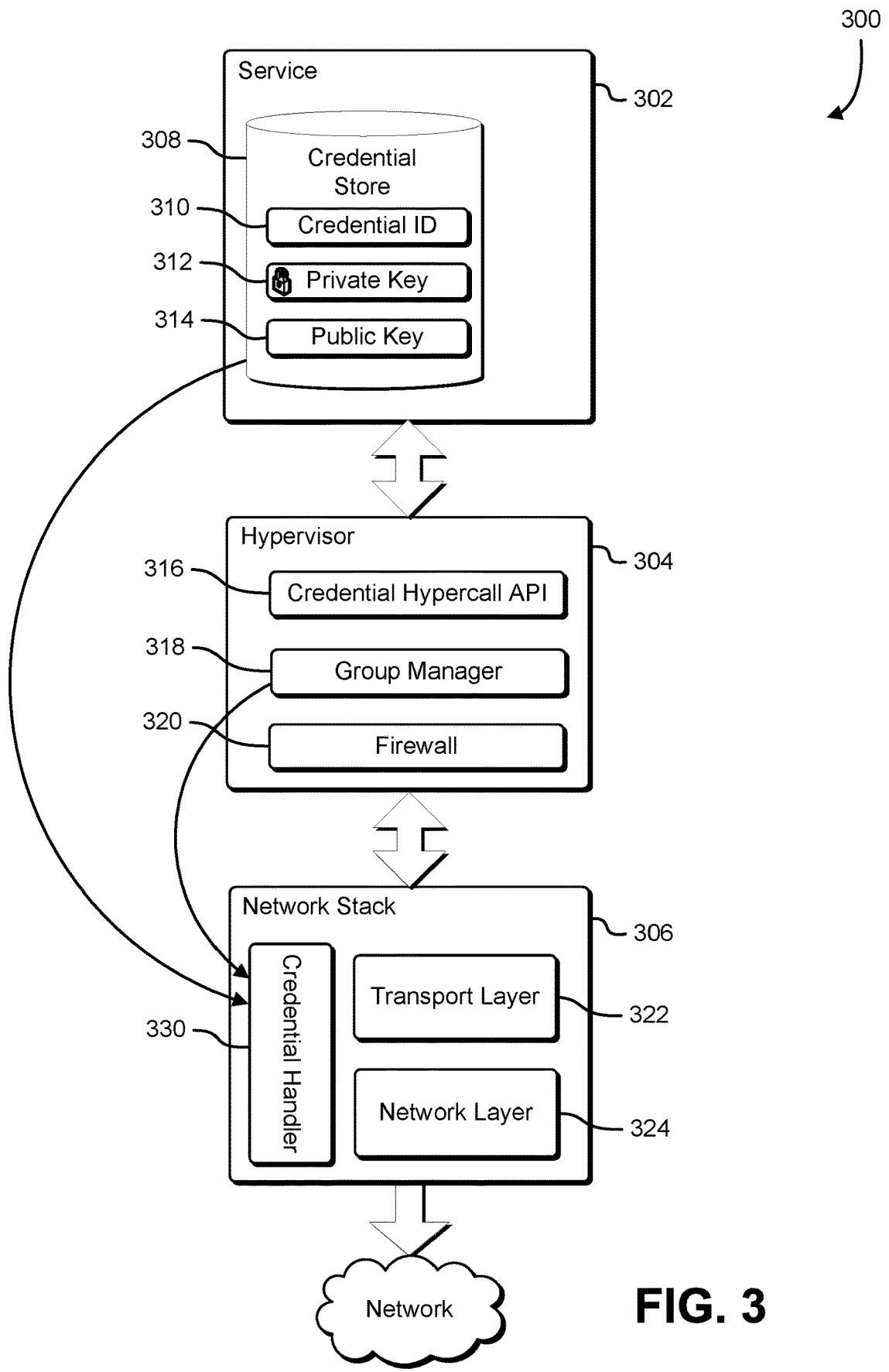
FIG. 3 shows an illustrative example of a system that provides a service that is provided by a virtual machine on a hypervisor, in accordance with an embodiment.

FIG. 3 shows an illustrative example of a system that implements a service using a virtual machine on a hypervisor, in accordance with an embodiment. A diagram 300 shows a system that includes a service 302 that runs in a virtual machine provided by a hypervisor 304. The hypervisor 304 communicates with a network stack 306. In some examples, the network stack 306 resides in the hypervisor 304. In other examples, the network stack 306 resides within an operating system that hosts the hypervisor 304. The service 302 maintains a credential store 308. The credential store 308 retains a collection of credentials.

The credential store 308 includes credential information that can be used to identify and validate a credential. In the implementation shown in the diagram 300, the credentials in the credential store 308 include a credential ID 310, and a public-private cryptographic key that includes a private key 312 and a public key 314. In some examples, the credentials in the credential store 308 include a credential ID and a symmetric cryptographic key. The cryptographic keys can be associated with an entity that controls the identified credential such as the service 302. If the cryptographic keys are associated with a particular credential, the credential ID can be omitted.

The hypervisor 304 includes a credential hypercall API 316, a group manager 318 and a firewall 320. The hypervisor 304 provides a virtualization platform that allows multiple operating systems to run on a host computer. In some embodiments, the hypervisor 304 can create and execute additional instances of the service 302, or instances of other services, applications, or operating systems. The credential hypercall API 316 provides an interface to the service 302 that allows the service 302 to configure the group manager 318 and the firewall 320. The credential hypercall API 316 also provides an interface that allows the service 302 to associate a particular credential with a network socket. In one example, the credential hypercall API 316 provides a setsocketopt( ) function. The setsocketopt( ) function takes a socket identifier and a credential as parameters, and passes the credential-socket association to components within the network stack 306. The group manager 318 categorizes and routes incoming traffic to the services hosted by the hypervisor 304. The group manager 318 may be configured automatically by observing network traffic that originates from the services hosted by the hypervisor 304, and manually through a hypercall API. The firewall 320 provides a software firewall for the services hosted by the hypervisor 304. Configuration of inbound network ports can be achieved via a programmatic interface provided to the service 302 or with a separate hypercall API that uses separate authentication.

The network stack 306 includes a transport layer 322 and a network layer 324. Each layer of the network stack 306 may be implemented using one or more commercially available protocols. In this document, a reference to a particular layer of the network stack 306 should be read as referring to the actual protocol implementation that implements the functionality defined by the particular layer. The transport layer 322 includes a transport protocol such as TCP. The transport layer 322 divides outgoing communication into a set of data packets, and recombines incoming packets to reform the original communication. In many examples, the transport layer 322 provides reliable, connection-based communications between clients and the service 302. The network layer 324 can be implemented using a network protocol such as IP. The network layer 324 provides network address information, and in some implementations, is able to route data packets from one network to another.

The network stack 306 includes a credential handler 330. The credential hander is an operational module that has access to incoming and outgoing network packets as they are processed by the various levels of the network stack 306. The credential handler 330 receives credential information from the credential store 308 and the group manager 318. The credential information identifies particular credentials that are associated with particular network connections and sockets, as well as credential-based filtering and firewall rules that can be applied to packets being processed within the network stack 306. The credential handler 330 adds credential information to outgoing network packets, and processes credential information on incoming network packets.

For an outgoing message, the transport layer 322 divides the outgoing message into a set of outgoing data packets. The outgoing data packets are processed by the credential handler 330 by adding credential information to each packet of the outgoing data packets. In some implementations, the credential information is added to the end of each outgoing data packet after the network layer 324 has added a network header to each outgoing data packet. When the credential information is added to the end of each outgoing data packet after a network or data link header has been added, the credential handler 330 adjusts the network or data link header to compensate for changes in the length of the data packet, or changes to the packet checksum, that may have been altered by the addition of the credential information to the data packet. In various examples, these adjustments help to maintain backwards compatibility with existing data link, network, and transport protocols.

For an incoming set of data packets, the credential handler 330 can process the set of data packets after they are processed by a data link layer, or after they are processed by the network layer 324. If the incoming set of data packets is processed before the set of data packets is processed by the network layer 324, the credential handler 330 adjusts the network packet headers based at least in part on changes in packet size and packet checksum when it removes the credential information from the end of each packet of the set of data packets. In various examples, the adjustments to the network packet headers maintain the data packet's compatibility with the network layer 324. The credential handler 330 filters the incoming set of data packets using the credential information contained in each data packet of the incoming data packets. In one example, the credential handler 330 determines whether the credential information contained in each data packet includes a valid digital signature. If a particular data packet does not contain a valid digital signature, the packet is discarded. In another example, the credential handler 330 applies one or more credential-based rules that describe particular credentials that, when included within a particular data packet, cause the particular data packet to be either discarded or accepted by the credential handler. In yet another example, the credential handler 330 allows a controlled amount of data packets that do not have credential information to be accepted.

In some embodiments, the hypervisor hosts a number of virtual machines that have individual network addresses. The hypervisor implements a virtual network between the hosted virtual machines and provides network bridging or routing functions between the virtual network and a physical network adapter on the host computer system. A firewall in the hypervisor provides traffic filtering at the packet level, with rules that are based on information maintained in the group manager. In some examples, the physical network adapter is a hardware dongle that includes computing resources that support the hypervisor, the firewall, and the hosted virtual machines.

In some examples, a number of network-based services are hosted on a network. Access to the network is controlled by a firewall that operates in accordance with the set of rules maintained by a group manager. Network packets are passed on to the computer network based at least in part on credentials identified by the digital signatures on the network packets. In some implementations, the various network-based services such as network-based computing services, network-based storage services, and network-based authentication services, are able to grant service requests described within the content of the network traffic by validating the digital signatures on the packets that carry the requests. The firewall blocks unsigned packets from being delivered to the network-based services by blocking packets that do not include a digital signature, or which include invalid digital signatures. In some examples, the various network-based services provide credential-based traffic filtering rules to the group manager, which can be used by the firewall to block network packets from the network that do not include authorized service requests.

Figure 4:
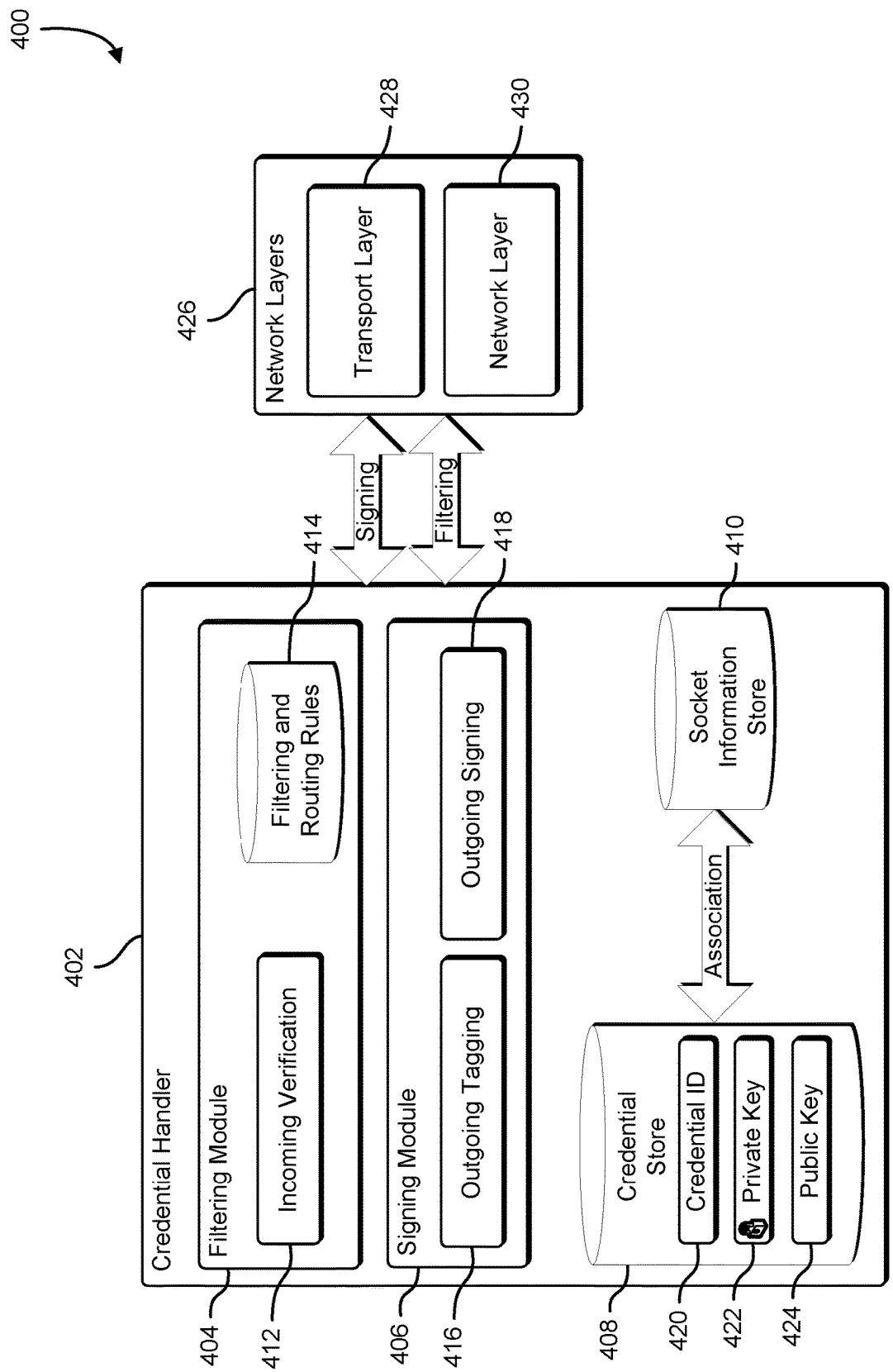
FIG. 4 shows an illustrative example of a block diagram for a credential handler, in accordance with an embodiment.

FIG. 4 shows an illustrative example of a block diagram for a credential handler, in accordance with an embodiment. A diagram 400 shows the internal structure of a credential handler 402. The credential handler 402 is an operational module within a networking stack that can add credential information to outgoing network packets, and filter incoming network packets based at least in part on credential information included with the incoming network packets. The credential handler 402 includes a filtering module 404, a signing module 406, a credential store 408, and a socket information store 410. The filtering module 404 examines incoming data packets and determines whether the incoming data packet should be discarded, throttled, or processed by higher levels of a networking stack and provided to a client application or service. When a particular data packet is received, an incoming verification module 412 examines the particular data packet and determines whether the particular data packet includes credential information. The filtering module 404 may be configured to throttle or limit the rate at which packets that do not contain credential information are accepted by the system. If the particular data packet does not include credential information, the filtering module 404 determines, based at least in part on the amount of data packets without credential information that have been previously accepted, whether the particular packet should be accepted by the system. If the particular data packet is associated with a logical connection managed by a transport layer, packets associated with the logical connection are accepted or rejected as a group by the filtering module 404. If the particular packet does include credential information, the filtering module 404 uses a set of filtering and routing rules 414 maintained by the filtering module 404. The filtering and routing rules 414 can be configured by an administrator, provided by a firewall or group manager, or provided by a client application or service. The filtering and routing rules 414 identify particular credentials that cause network packets that are associated with the particular credentials to be discarded, accepted, or filtered. The filtering module 404 identifies the particular credential that is associated with the particular data packet. If the particular credential includes a digital signature, the filtering module 404 verifies that the digital signature is authentic. If the digital signature is not authentic, the particular data packet may be discarded. Based at least in part on the identified particular credential, and the filtering and routing rules 414, the filtering module 404 discards, accepts, or applies throttling to the particular data packet. If the filtering module 404 determines that a particular data packet is to be accepted, the filtering module 404 removes the credential information from the particular data packet and adjusts network protocol headers on the particular data packet to account for the removal of the credential information.

The credential handler 402 includes a signing module 406. The signing module 406 includes an outgoing tagging module 416 and an outgoing signing module 418. The signing module 406 processes outgoing data packets by adding credential information to each packet of the outgoing data packets. The outgoing tagging module 416 examines a particular outgoing data packet and identifies an associated socket or other network identifier. The outgoing tagging module 416 finds the associated socket in the socket information store 410, and follows a link or association to the credential store 408. The credential store 408 contains a credential ID 420, a private key 422, and a public key 424, for the associated socket. The outgoing tagging module 416 adds the credential ID 420 to the particular outgoing data packet. The outgoing signing module 418 uses the private key 422 to add a digital signature to the particular outgoing data packet. In some implementations, the signing module 406 adds the public key 424 to the particular outgoing data packet. In other implementations, the signing module 406 adds a digital signature based at least in part on a symmetric cryptographic key. As a result of adding credential information to the particular outgoing data packet, the signing module 406 may alter network protocol header information on the particular outgoing data packet. For example, if the particular outgoing data packet includes an IP header prior to the addition of credential information by the signing module 406, the signing module 406 updates the IP header to adjust for changes in packet length and checksum to retain compliance with the IP protocol standard. Transport protocol headers and data link headers can also be adjusted.

The credential handler 402 interacts with a set of network layers 426 to perform packet signing and filtering operations. The set of network layers 426 includes a transport layer 428 and a network layer 430. The filtering module 404 can extract and process incoming data packets from a data link layer or from the network layer 430. The signing module 406 can modify outgoing packets from the transport layer 428 and/or the network layer 430. In one example, the filtering module 404 receives packets from the network layer 430, and forwards accepted packets to the transport layer 428. The signing module receives packets from the transport layer 428 and forwards credential-signed packets to the network layer 430. In another example, the filtering module 404 receives packets from a data link layer, and forwards accepted packets to the network layer 430. The signing module receives packets from the network layer 430 and forwards credential-signed packets to the data link layer.

Figure 5:
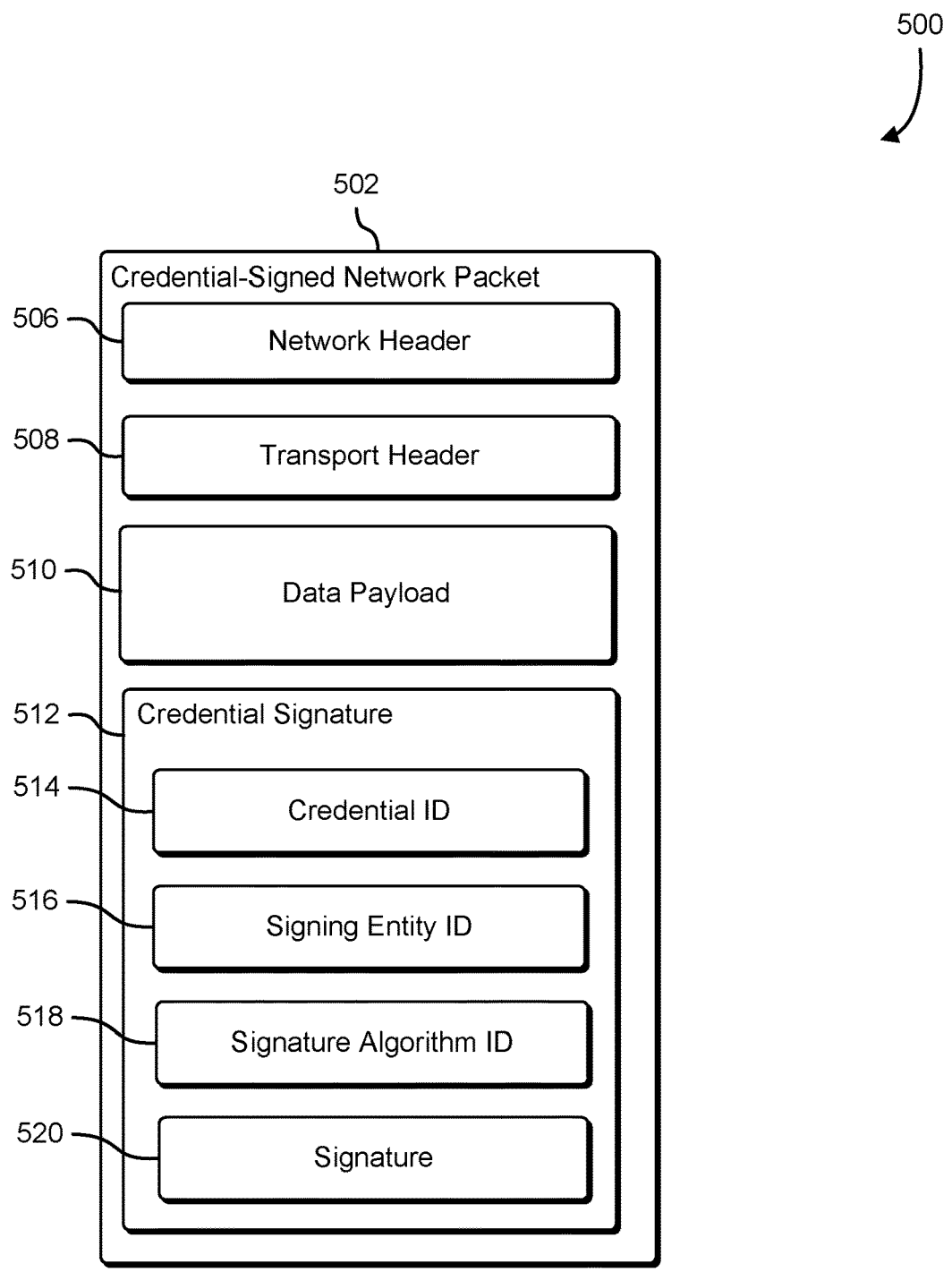
FIG. 5 shows an illustrative example of a credential-signed network packet, in accordance with an embodiment.

FIG. 5 shows an illustrative example of a credential-signed network packet, in accordance with an embodiment. A diagram 500 shows the structure of a credential-signed network packet 502. The credential-signed network packet 502 includes a network header 506, a transport header 508, a data payload 510, and a credential signature 512. The network header 506 is a protocol header added by a network level protocol of a networking stack. In various implementations the network protocol may be implemented using IP, IPX, IPv4 or IPv6, and the network header 506 may be a header corresponding to any of the above network protocols. The transport header 508 is applied by a transport protocol of a networking stack. In one example, the transport header is a TCP header. The data payload 510 is data provided by a client application, service, or other network client for delivery to a destination.

The credential signature 512 includes a credential ID 514, a signing entity ID 516, a signature algorithm ID 518, and a signature 520. The credential ID 514 identifies a particular credential that is associated with the credential-signed network packet 502. The credential ID 514 may be an integer, string, global unique identifier ("GUID"), or other value used to identify a particular credential. The signing entity ID 516 identifies the entity that generated the credential signature 512. The signing entity ID 516 may identify a particular client application or service. In some examples, the signing entity ID 516 may be omitted when the signature 520 is associated with a credential identified by the credential ID 514. Signature algorithm ID 518 identifies the particular algorithm used to generate the signature 520. If more than one signature algorithm is not used to generate the signature 520, the signature algorithm ID 518 may be omitted. The signature 520 may be generated using a private key of a public-private key pair, or using a symmetric key. If a private key is used, the credential signature 512 may include the public key. In some examples, symmetric keys may be generated and shared between a sender and the recipient using key exchange algorithms such as Diffie-Heilman, or quantum key exchange algorithms.

In some implementations, the credential signature may be embedded within the network header 506. In one example, the network header 506 is implemented using the IPv6 protocol. An IPv6 extension header is added to the IPv6 header that includes the information contained within the credential signature 512. Additional information on the IPv6 protocol can be found in RFC 793 which is herein incorporated by reference. In another example, the extension header conforms to the uniform format for IPv6 extension headers described in RFC 6564 which is herein incorporated by reference.

The credential signature 512 can include a timestamp which is signed as part of the signature-generation process. In some implementations, the timestamp specifies the time that the credential-signed network packet 502 was transmitted. When the credential-signed network packet 502 is received, the timestamp is compared to a current time, and the difference is compared to a threshold value. If the difference is greater than the threshold value, the credential-signed network packet 502 is discarded. The threshold value is determined so that if an attacker attempts a replay attack, the replayed network packets will be rejected by the system. In other implementations, the timestamp specifies expiration time for the credential-signed network packet 502. The timestamp is calculated by adding the threshold value to the current time, and signing the timestamp with signature 520. When the credential-signed network packet 502 arrives at the recipient, the recipient compares the timestamp to the current time. If the current time is later than the time indicated by the timestamp, the credential-signed network packet 502 is discarded.

Figure 6:
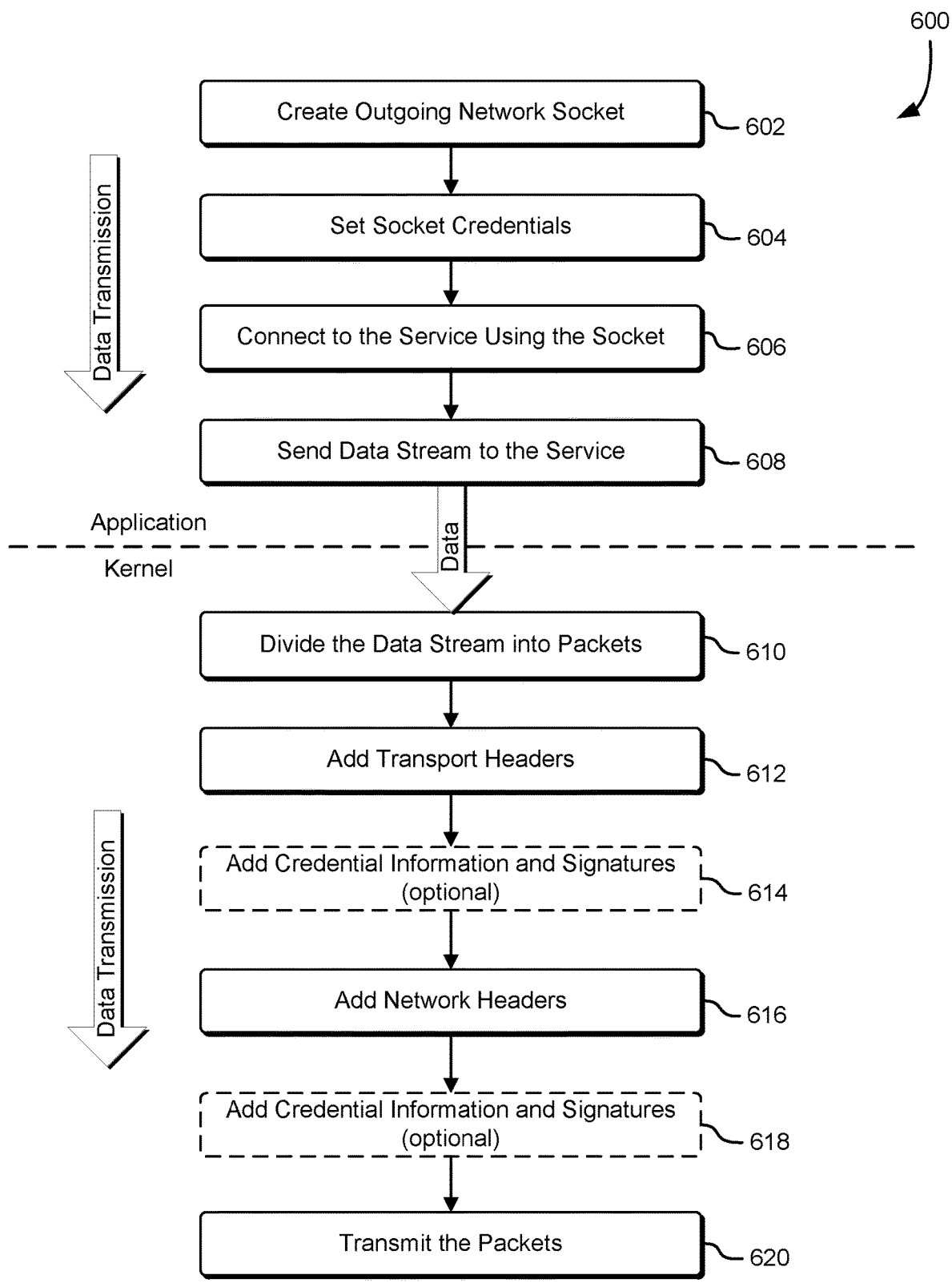
FIG. 6 shows an illustrative example of a process that, when performed by a client computer system, transmits credential-signed network packets over a computer network, in accordance with an embodiment.

FIG. 6 shows an illustrative example of a process that, when performed by a client computer system, transmits credential-signed network packets over a computer network, in accordance with an embodiment. A process diagram 600 shows a process that, when performed by an application, provides a stream of data to a networking stack running within a kernel. The networking stack performs a corresponding process that divides the stream of data into a collection of outgoing data packets, adds credential information to the outgoing data packets, and transmits the outgoing data packets to a recipient. The application may be a client application running on a client computer system or an application that implements a service on a server computer system. At block 602, the application creates an outgoing network socket. The application determines a credential that will be associated with traffic transmitted using the created outgoing network socket. The application associates the credential with the outgoing network socket by setting, at 604, a socket option using a sockets API function such as setsocketopt( ). In some implementations, the application calls into a credential API in a hypervisor to associate the credential with the outgoing network socket. At block 606, the application initiates the connection to the recipient by, for example, by calling a connect( ) function of the sockets API. At block 608, the application sends the data over the established connection.

Once the application commits to sending the data over the established connection, the data is passed to a kernel-based networking stack. At block 610, the networking stack divides the data stream received from the application into a set of data packets. Transport protocol headers are added 612 to each data packet in the set of data packets. In some implementations, at block 614, a credential handler within the networking stack may optionally add credential information to each packet in the set of data packets. The credential information includes a credential ID and a cryptographic signature. The transport protocol headers may be modified to account for the addition of the credential ID and the cryptographic signature in order to maintain compatibility with the transport protocol. At block 616, the networking stack adds network protocol headers that include network destination information to each data packet in the set of data packets. At block 618, the credential handler may optionally add credential information to each packet in the set of data packets. The transport protocol headers and network protocol headers may be modified to account for the addition of the credential ID and the cryptographic signature in order to maintain compatibility with the transport and network protocols. At block 620, the completed data packets are transmitted over the network to the recipient.

Figure 7:
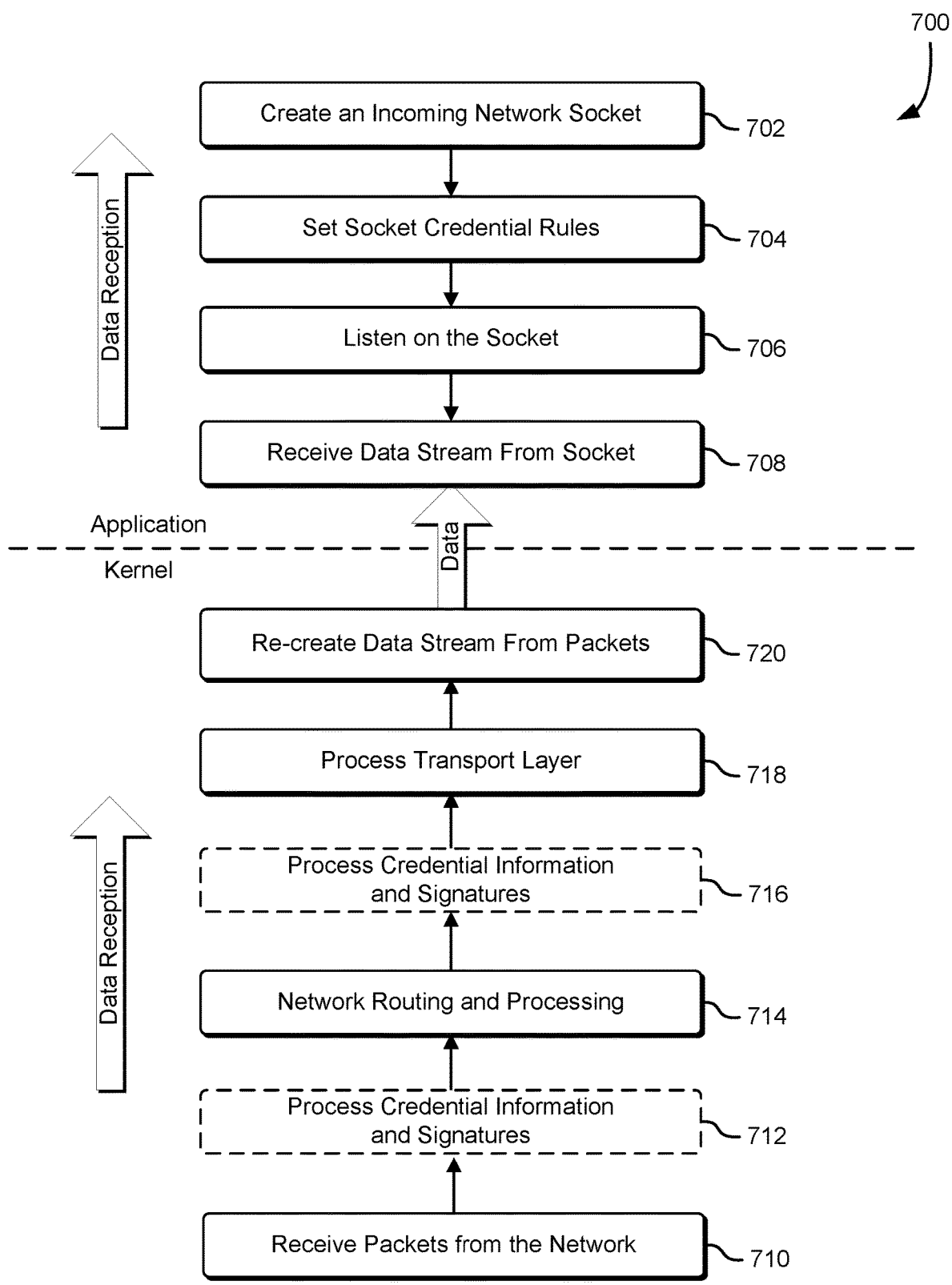
FIG. 7 shows an illustrative example of a process that, when performed by a service computer system, receives credential-signed network packets over a computer network, in accordance with an embodiment.

FIG. 7 shows an illustrative example of a process that, when performed by a service computer system, receives credential-signed network packets over a computer network, in accordance with an embodiment. A process diagram 700 shows a process that, when executed by a receiving application and a network stack, processes incoming data packets that include credential information. At block 702, the receiving application creates an inbound network socket. The receiving application identifies a set of credential rules that are applicable to the network traffic received using the socket. The receiving application applies 704 the set of credential rules to the inbound socket using a socket option API or a hypercall API that provides the set of credential rules to the network stack or a hypervisor respectively. At block 706, the receiving application activates the socket by performing a blocking or nonblocking socket-listening operation. At block 708, the receiving application receives the data stream from the socket. If the receiving application performs a blocking listening operation, the application may continue execution after receiving the data stream. If the receiving application performs a nonblocking listening operation, the receipt of the data stream may trigger a callback or unblock a waiting subprocess.

At block 710, the networking stack receives a collection of credential-signed data packets via the network. At block 714, the network stack processes the collection of data packets according to a network protocol, and the network protocol headers are removed from the collection of data packets. At either or both of blocks 716 and 712, the credential handler within the network stack determines whether each data packet in the collection of data packets includes a credential signature. If a particular packet includes a credential signature, the credential handler validates the credential signature and identifies the particular credential associated with the particular packet. The particular packet is discarded, processed according to a network throttling algorithm, or forwarded to a transport layer of the network stack, based at least in part on the credential rules provided by the receiving application. If a particular packet is forwarded to the transport layer of the network stack, the credential information is removed from the particular packet. In some implementations, transport, network, or data link protocol headers of the particular packet are adjusted when the credential information is removed from the particular packet. At block 718, the network stack processes the packets that are forwarded from the credential handler according to a transport protocol of the network stack. The transport protocol reassembles 720 the packets into a data stream which is provided to the client application.

Figure 8:
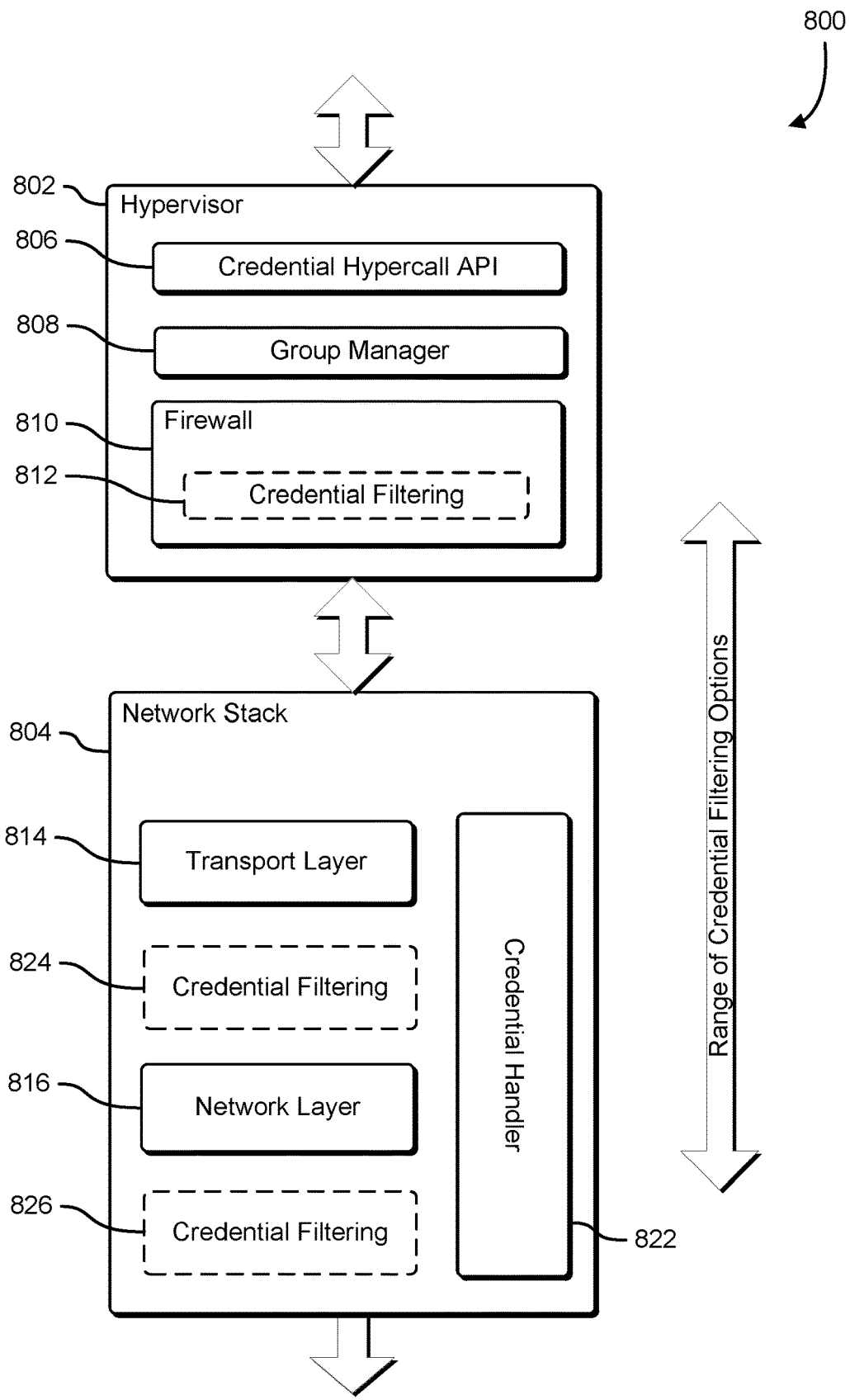
FIG. 8 shows an illustrative example of a system that performs credential-based network traffic filtering using one or more optional credential filters positioned throughout the system, in accordance with an embodiment.

FIG. 8 shows an illustrative example of a system that performs credential-based network traffic filtering using one or more optional credential filters positioned throughout the system, in accordance with an embodiment. A diagram 800 shows a system that performs credential-based filtering of network packets at various points within the system. The system includes a hypervisor 802 and a network stack 804 that operates within a host operating system. The hypervisor 802 includes a credential hypercall API 806, a group manager 808, and a firewall 810. The firewall 810 may include a credential filtering module 812. The credential filtering module 812 applies a set of credential rules that may be provided by a client application or the group manager 808.

The network stack 804 includes a transport layer 814 and a network layer 816. A credential handler 822 adds credential information to outgoing network packets and processes incoming network packets according to a set of credential rules. The credential handler 822 can provide a number of credential filters 824 and 826. The system can provide credential-based filtering of incoming network packets using one or more of the credential filters, including the credential filtering module 812 in the hypervisor 802, to perform credential-based filtering operations. In some implementations, the system selects the point at which credential-based filtering is performed based at least in part on the processing load on the hypervisor 802, the percentage of packets that are discarded during credential-based filtering operations, the number of packets that are discarded during credential-based filtering operations, and the detection of a "denial of service" attack. For example, if a "denial of service attack" is detected, it may be desirable to discard unapproved packets at a lower level in the network stack 804, and a credential filter 826 may be activated and configured to discard packets that do not contain a valid credential signature. In another example, if the percentage of packets that are discarded during credential-based filtering operations is below a threshold level, the credential filtering module 812 may be activated and other credential filters deactivated so that credential-filtering operations occur within the hypervisor.

Figure 9:
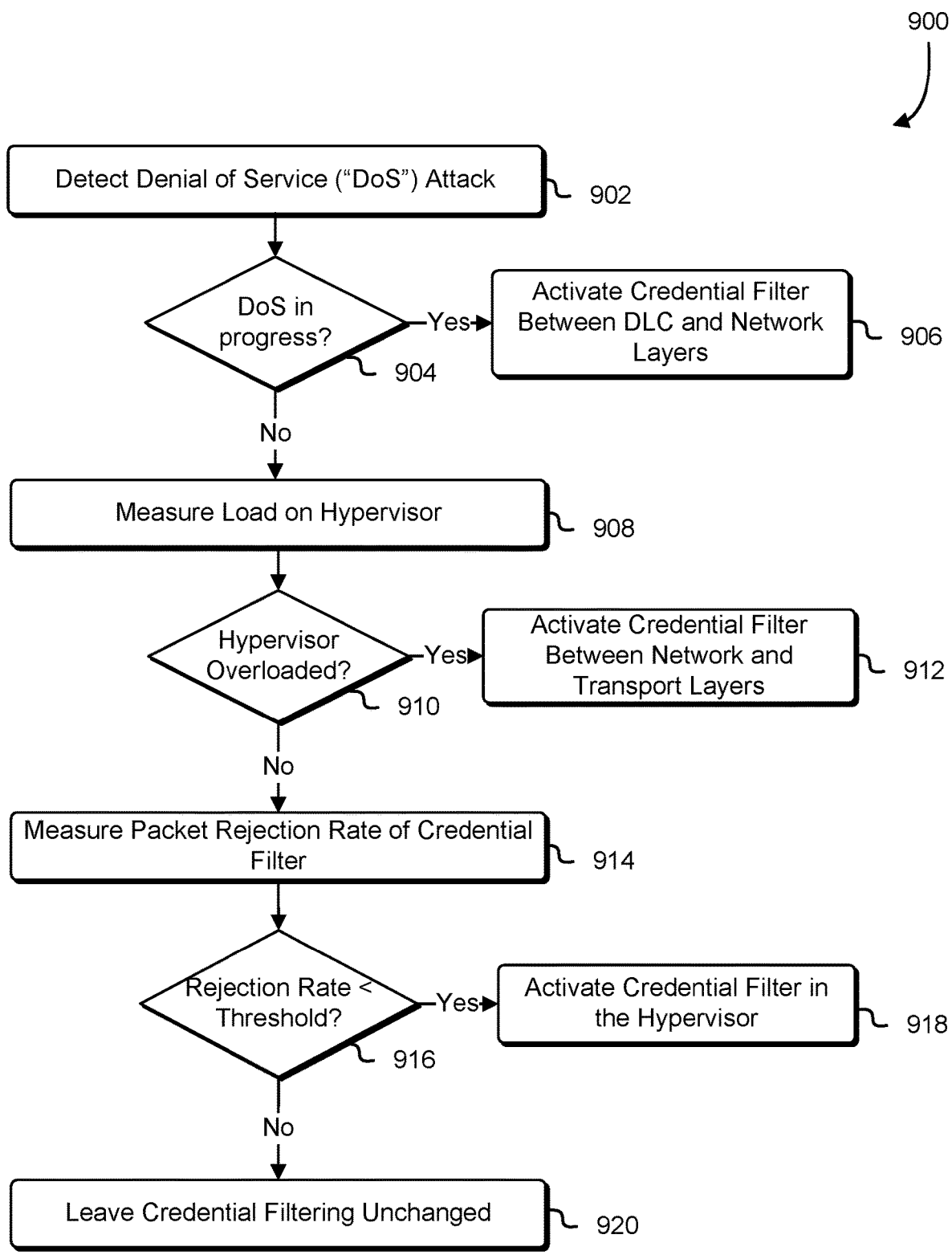
FIG. 9 shows an illustrative example of a process that, when performed by a computer system, configures a number of optional credential filters in the computer system, in accordance with an embodiment.

FIG. 9 shows an illustrative example of a process that, when performed by a computer system, configures a number of optional credential filters in the computer system, in accordance with an embodiment. A process diagram 900 illustrates a process that, when performed by a receiving computer system, adjusts the point at which credential-based packet filtering is performed based at least in part on a number of observed conditions. At block 902, the system performs operations to determine whether a denial of service attack is occurring. The system determines 904 that the denial of service attack is in progress, and as a result, activates 906 a credential filter between the data link layer and a network layer of the networking stack. At block 908, the system performs operations that measure the computing load on the hypervisor. If the measured computing load on the hypervisor is greater than a predetermined threshold value, the system determines 910 that the hypervisor is overloaded. As a result of the hypervisor being overloaded, the system activates 912 a credential filter between the network and transport layers of the networking stack. At block 914, the system performs operations that measure the packet rejection rate of an active credential-based packet filter. If the packet rejection rate of the active credential-based packet filter is less than a predetermined threshold value, the system determines 916 that the hypervisor should receive and perform credential-based filtering operations. At block 918, the system activates the credential filter in the hypervisor. If the system determines that the packet rejection rate of the active credential-based path filter is not less than the predetermined threshold value, the system leaves 920 the credential-based filtering components in their present configuration.

Figure 10:
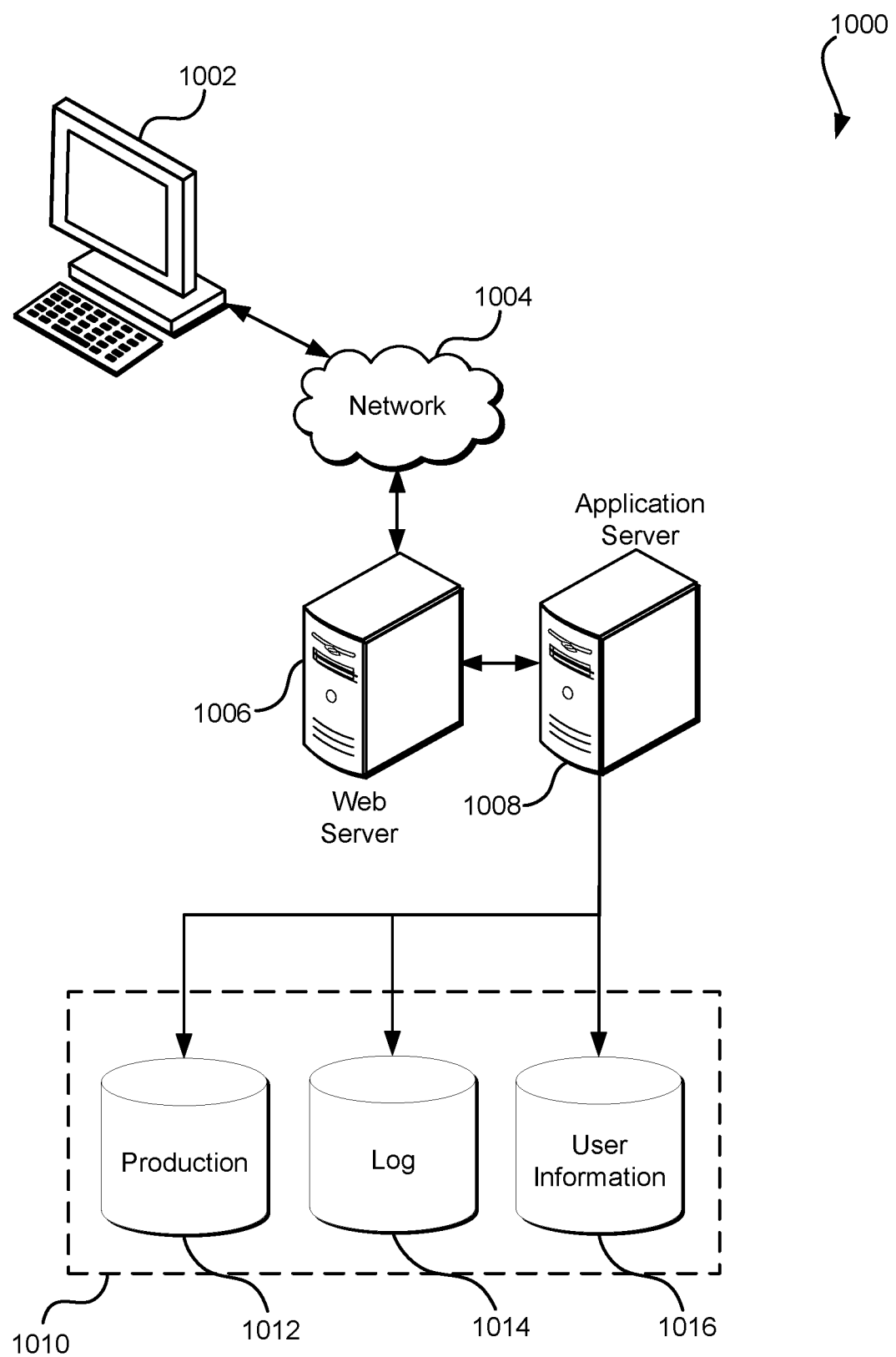
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

Some implementations are practiced in an environment that includes a number of network-based services. Network-based services may be accessed from a computer network. A computer network supporting network-based services may be accessible from a private network or a public network such as the Internet. Network-based services may include computing services, storage services, authentication services, key management services, encryption services, virtual networking services, or other services. In some examples, network-based services use a shared authentication system to authorize service requests and authenticate clients. Network-based services can be implemented on a computer system, a virtual computer system, or a number of computer systems and virtual computer systems interconnected with a network.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. In some examples, a server may be substituted with a network-based service, such as a database server being replaced by a network-based database service. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of requests and responses, as well as the delivery of content between the client device 1002 and the application server 1008, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In the current document, a particular protocol that operates primarily within the boundaries defined by a particular layer of the OSI model may be referred to simply by referring to the name of the particular layer of the OSI model. For example, a reference to "a transport layer of a networking stack" should be interpreted as referring to an implementation of a networking protocol (such as TCP) that primarily implements the transport layer of the OSI model.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments, data objects such as signed data packets may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CASTS, RC4, and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

In the preceding and following description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A non-transitory computer-readable storage medium having stored thereon executable instructions that, if executed by one or more processors of a computer system, cause the computer system to at least:
   associate a credential with a network socket by providing a credential identifier and a cryptographic key associated with the credential to a socket application programming interface; and
   add a credential signature to a packet, the packet based at least in part on data provided to the network socket, and the credential signature based at least in part on the credential and information in the packet.

2. The non-transitory computer-readable storage medium of claim 1, wherein the instructions that associate the credential with the network socket are configured to cause association of the credential with the network socket by providing the credential identifier and the cryptographic key associated with the credential to a socket application programming interface along with a socket identifier that is associated with the network socket.

3. The non-transitory computer-readable storage medium of claim 1, wherein the instructions further comprise further instructions that, if executed by the one or more processors, cause the computer system to:
   associate a credential rule with a second network socket; and
   determine that a second packet that is acquired via the second network socket includes a valid credential signature, the valid credential signature identifying a second credential, and the second credential in accordance with the credential rule.

4. The non-transitory computer-readable storage medium of claim 3, wherein the instructions further comprise a set of instructions that, if executed by the one or more processors, cause the computer system to remove the valid credential signature from the second packet.

5. The non-transitory computer-readable storage medium of claim 3, wherein the instructions further comprise a set of instructions that, if executed by the one or more processors, cause the computer system to:
   generate a data stream that includes the second packet; and
   provide the data stream to an application.

6. The non-transitory computer-readable storage medium of claim 3, wherein the instructions that associate the credential rule with the second network socket further comprise a set of instructions that, when executed by the one or more processors, cause the computer system to:
   store a collection of credential rules in a group manager within a hypervisor, the storing configured via an administrative console; and
   select, based at least in part on the second network socket, the credential rule from the collection of credential rules.

7. The non-transitory computer-readable storage medium of claim 3, wherein the instructions further comprise a set of instructions that, if executed by the one or more processors, cause the computer system to:
   determine whether a particular data packet does not include a credential signature; and
   as a result of determining that the particular data packet does not include the credential signature, apply a firewall rule to the particular data packet to determine whether the particular data packet should be passed to an application.

8. The non-transitory computer-readable storage medium of claim 1, wherein the instructions further comprise a set of instructions that, if executed by the one or more processors, cause the computer system to:
   associate a credential rule with a second network socket;
   determine that a second packet that is acquired via the second network socket includes an invalid credential signature; and
   as a result of determining that the second packet includes the invalid credential signature, discard the second packet.

9. A system comprising a set of one or more processors and memory that implement one or more services, the one or more services:
   associating a credential with a network socket;
   providing a credential identifier and a cryptographic: key associated with the credential to a socket application programming interface; and
   adding a credential signature to a packet, the packet based at least in part on data provided to the network socket, and the credential signature based at least in part on the credential and information in the packet.

10. The system of claim 9, wherein associating the credential with the network socket comprises the one or more services further providing the credential identifier and the cryptographic key associated with the credential to a socket application programming interface along with a socket identifier that is associated with the network socket.

11. The system of claim 9, wherein the one or more services further:

associate a credential rule with a second network socket; and determine that a second packet that is acquired via the second network socket includes a valid credential signature, the valid credential signature identifying a second credential, and the second credential in accordance with the credential rule.

12. The system of claim 11, wherein the one or more services further remove the valid credential signature from the second packet.

13. The system of claim 11, wherein one or more services further:

generate a data stream that includes the second packet; and provide the data stream to an application.

14. The system of claim 11, wherein the services further:

store, using an administrative console, a collection of credential rules in a group manager within a hypervisor; and select, based at least in part on the second network socket, the credential rule from the collection of credential miles.

15. A computer-implemented method, comprising:

associating a credential with a network socket;

providing a credential identifier and a cryptographic key associated with the credential to a socket application programming interface; and adding a credential signature to a packet, the packet based at least in part on data provided to the network socket, and the credential signature based at least in part on the credential and information in the packet.

16. The computer-implemented method of claim 15, further including providing the credential identifier and the cryptographic key associated with the credential to a socket application programming interface along with a socket identifier that is associated with the network socket, the providing being a part of associating the credential with the network socket.

17. The computer-implemented method of claim 15, further including:

associating a credential rule with a second network socket; and determining that a second packet that is acquired via the second network socket includes a valid credential signature, the valid credential signature identifying a second credential, and the second credential in accordance with the credential rule.

18. The computer-implemented method of claim 17, further comprising removing the valid credential signature from the second packet.

19. The computer-implemented method of claim 17, further comprising:

determining whether a particular data packet does not include the credential signature; and as a result of determining that the particular data packet does not include the credential signature, applying a firewall rule to the particular data packet to determine whether the particular data packet should be passed to an application.

20. The computer-implemented method of claim 15, further comprising:

associating a credential rule with a second network socket;

determining that the second network packet includes an invalid credential signature; and as a result of determining that the second network packet includes the invalid credential signature, discarding the second network packet.

* * * * *